May 9, 1967  KEITARO KANADA  3,319,143
CONTROL UNIT FOR WINDSHIELD WIPER
Filed Dec. 14, 1964
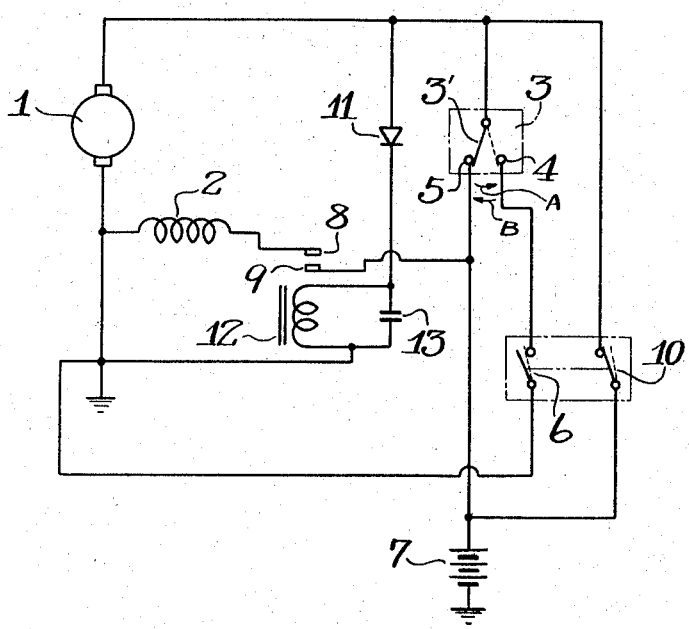
INVENTOR.
KEITARO KANADA
BY
Linton and Linton
ATTORNEYS

United States Patent Office 3,319,143
Patented May 9, 1967

3,319,143
CONTROL UNIT FOR WINDSHIELD WIPER
Keitaro Kanada, Toyohashi-shi, Japan, assignor to Nippon Denso Kabushiki Kaisha, Aichi-ken, Japan
Filed Dec. 14, 1964, Ser. No. 417,912
Claims priority, application Japan, Aug. 21, 1964, 39/47,614
3 Claims. (Cl. 318—275)

The present invention relates to improvements for the automatic terminal-position stopper for electrically stopping the motor of a front-window wiping device for wiping the front window of an automobile with the object of stopping precisely the wiper in the terminal position at the end of the front window.

Such a device as this heretofore used to be so operated that the power source of the motor of the device is cut off and at the same time the motor armature is short-circuited by a switch which is automatically operated upon being interlocked with the armature when the wiper of the wiping device has arrived at the terminal position; a short-circuit current reverse to the steady-state current is caused by a counter electromotive force generated in the armature winding in the magnetic field in the same direction with the steady rotation by residual magnetism of the field system; and a rotation force reverse to the normal rotation is generated so as to cause an electric braking, so that the electromotive force generated in the armature winding by residual magnetism in the armature is relatively small and thereby the braking effect is relatively slight, to the point of being a defect. For this reason, if and when the armature circuit is cut off from the power source and short-circuited and electrification is continued for the field winding, a powerful braking effect is obtainable but the difficulty is that the current continues still in the field winding even during a stop of the motor.

In order to eliminate the aforementioned defects the present invention is directed to causing a powerful, reverse rotation force by running a current to the field winding during only some time subsequent to a cutoff of the power source to the armature so that the motor may be stopped automatically at the home position always with an excellent result. The present invention is illustrated in the following in reference to a preferred embodiment as shown in the sole figure of the accompanying attached drawing.

The figure is an electric wiring diagram of the device according to the present invention, in which:

1 denotes the armature of a motor that is driving the wiper not shown in the drawing, one end of the winding of said armature being grounded at G along with one end of the field winding 2 and of the armature winding the other end being connected to the switch arm 3' of a switch 3. The said switch arm 3' swings in the arrow A direction and comes into contact with the switch contact 4 when the wiper has reached to the terminal position where the wiper is to stop, and the arm 3' is driven by a cam provided on the shaft of the motor armature 1 in a manner such that it changes in the Arrow B direction and comes into contact with the switch contact 5 out of its terminal position. And the said switch contact 4 has been connected to a manually operated switch 6 and the switch contact 5 has been connected with the battery 7. This cycle of connections is repeated once during every cycle of operation of the wiper.

The other end of the field winding 2 is connected with the battery 7 through a relay having a movable contact 8 and a fixed contact 9. In addition, the other end of the winding of said armature 1 is interlocked with the manually operated switch 6 is connected to the battery 7 through a switch 10 opened and closed interlocked with switch 6 and is grounded through the parallel connection circuit of a diode 11 for controlling discharge and a relay winding 12 with a condenser 13. In mechanically interlocked switches 6 and 10, switch 10 is closed when switch 6 is open. When the switch 10 is on or, even the switch 10 is off, the contact lever 3' of the switch 3 is in contact with the contact 5, the winding of armature 1 is energized by a battery 7 across either the switch 10 or the contact lever 3'. At the same time, a relay winding 12 is energized across a diode 11 which restricts the direction of current flow. The energized relay winding 12 attracts relay movable contact 8 so that the movable contact 8 comes into contact with relay fixed contact 9. Upon contact of the movable contact 8 with the fixed contact 9, an armature field 2 is energized by the battery 7. At this time, condenser 13 arranged in parallel with the relay coil 12 is charged.

The switch 10 is initially closed to start the wiping device and the mechanically interlocked switch 6 is opened, and at this time a current runs to the winding of armature 1 by way of the closed switch 10 from the battery 7 and at the same time current runs to the relay winding 12 and the condenser 13 from the battery 7 through the switch 10 and the diode 11; by the relay winding 12 the relay arm 8 is attracted to come into contact with the relay fixed contact 9; the current runs from the battery 7 to the motor field winding 2 through the switch 10, the switch arm 3', the switch contact 5 as well as the said relay contacts 8 and 9 so as to rotate the armature 1; and then the wiper not shown in the drawing will start the wiping device. The said relay condenser 13, at this occasion, is charged. And a full charge state is maintained because of the diode 11. In order to stop the wiping activity of the wiper, the current, initially, runs in the circuit of ground-battery 7-contact 5-switch arm 3'-armature 1-ground when the switch 10 is opened and the switch 6 is closed; and the current runs from the battery 7 to the motor field winding 2 through the relay contact 9 and the relay contact 8, so that the rotation of the armature 1 will not stop. When the wiper arrives, however, in the terminal position at the end of the front window, the circuit consisting of ground-battery 7-switch contact 5-switch arm 3'-armature winding 1-ground is opened because the switch arm switch 3' comes into contact with the switch contact 4 upon changeover to the said side.

Then, the winding of armature 1 will be shortcircuited, since the circuit ground-armature 1-arm 3'-contact 4-switch 6-ground is conpleted. And the relay movable contact 8 will come into contact with the relay fixed contact 9 by the attractive force of the relay winding 12, since the condenser 13 starts discharge through the winding 12 and the current flows in the winding 12 for some time. The current thereupon will run through the relay contacts 8 and 9 from the battery 7 to the motor field winding 2, and a magnetic flux similar to a steady state is generated, so that a great deal of counter electromotive force is generated in the winding of armature 1 and a powerful, reverse rotation force is generated, thus causing instantaneously stopping the armature 1 at a specified position.

In the above case, since the diode 11 has been connected, a discharge current of the condenser 13 will pass through in the electromagnetic winding 12 alone; and when the discharge current of the condenser 13 increases to a certain value, the relay movable contact 8 and the relay fixed contact 9 will be released and the motor field winding 2 will be also disconnected from the battery 7 as a power source. Consequently it will not happen that current continues still in the field winding 2 during a stop of the wiping device.

If the diode 11 is taken out of the point which is directly connected so as to charge the relay winding 12 directly from the battery 7, the discharging current of the condenser 13 does not effectively flow across the relay winding 12, but flows through such circuits as across the switch arm 3', switch contact 4, and the switch 6 and through the winding of armature 1.

The device of the present invention is so composed that the motor is disconnected from the power source in order to stop automatically at the terminal position the motor for the wiping device having a field winding, and, in the case of shortcircuiting the armature; the field winding for generating a magnetic field effective in the dynamic brake alone is disconnected from the power source with a delay, and accordingly, in the present invention, there is an excellent merit to the effect that there is considerable magnetic flux at the time of controlling the power generation so that a powerful braking effect may be obtained and the wiper may be precisely stopped automatically in the terminal position at the end of the front window, in addition to the advantage that the field winding may be disconnected from the power source completely during a stop of the motor.

What I claim is:

1. In an electric windshield wiper adapted to be stopped at a predetermined position, a combination of an electric motor having an armature and a field winding, said armature having an armature winding, a shunt field circuit for said armature winding, a battery, means for connecting said battery to the armature winding of said motor, said armature being adapted to be dynamically braked by short-circuiting the two terminals of the winding of said armature when it is not energized, a relay having a winding inserted in said shunt field circuit of said armature and connected to be energized and deenergized at the same times with said armature winding, said relay having contacts connected to make and break said field circuit, and a condenser inserted in parallel with the winding of said relay, said relay being energized during the time when said condenser is being discharged and to flow a current across said shunt field for continuing the action of the magnetic field, by energizing said relay winding with the discharge current of said condenser just after said two terminals of said armature winding have been short-circuited by disconnecting energization of said armature winding and of said relay from said battery, whereby said armature is effectively dynamically braked so as to ensure stopping of said electric windshield wiper at said predetermined position.

2. In an electric windshield wiper adapted to be stopped at a predetermined position, according to claim 1, and a uni-directional diode connected in series with said relay winding in such a direction as to restrict a current flowing from said relay winding to said battery but permit the flow in the opposite direction, whereby said discharge current of said condenser is made to effectively flow across only said relay winding so as to cause a delayed action of said relay.

3. In an electric windshield wiper adapted to be stopped at a predetermined position, according to claim 1, said motor having a main shaft, a control cam mounted on said shaft, and means actuatable by said cam for alternately cyclically operating said means for connecting and disconnecting said battery to the winding of said motor.

References Cited by the Examiner

UNITED STATES PATENTS

| | | | |
|---|---|---|---|
| 2,307,204 | 1/1943 | Ehrlich | 318—381 |
| 2,734,139 | 2/1956 | Malone | 318—373 |
| 2,945,998 | 7/1960 | Vanderberg | 318—373 |

ORIS L. RADER, *Primary Examiner.*

B. DOBECK, *Assistant Examiner.*